United States Patent
Noble

[15] 3,661,091
[45] May 9, 1972

[54] SINGLE GUIDE MEMBER TRANSIT VEHICLE SWITCHING MECHANISM

[72] Inventor: Peter M. Noble, Valencia Township, Butler County, Pa.

[73] Assignee: Westinghouse Air Brake Company, Swissvale, Pa.

[22] Filed: Dec. 23, 1969

[21] Appl. No.: 887,615

[52] U.S. Cl. ............................................. 104/130, 246/433
[51] Int. Cl. ................................... E01b 25/12, E01b 7/04
[58] Field of Search ................................ 104/88, 96–101, 104/130–132; 246/433

[56] References Cited

UNITED STATES PATENTS

| 90,272 | 5/1869 | Kerr | 246/433 |
| 792,646 | 6/1905 | Byron | 246/433 |
| 1,465,312 | 8/1923 | Oyen | 104/131 |
| 3,252,428 | 5/1966 | Steinkamp | 104/130 |

Primary Examiner—Arthur L. La Point
Assistant Examiner—D. W. Keen
Attorney—H. A. Williamson, A. G. Williamson, Jr. and J. B. Sotak

[57] ABSTRACT

This disclosure relates to a roadway switch for self-guided vehicles having at least two selectable routes of travel. The switch includes at least two movable I-beams each having one end pivotally mounted for movement in two modes. A rotatable member supports the outer end of each of the movable I-beams and permits movement of the other end of the I-beams in three modes. An electric motor is incorporated for rotating the rotatable member between a first and second position whereby one of the I-beams establishes the route of travel for the self-guided vehicles.

12 Claims, 3 Drawing Figures

INVENTOR
Peter M. Noble.
BY

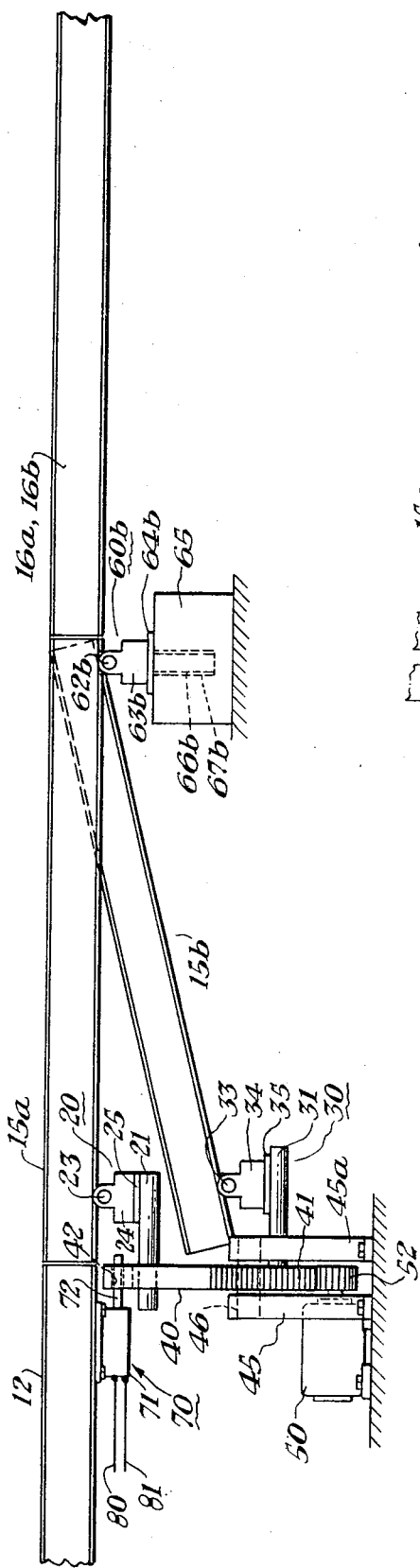
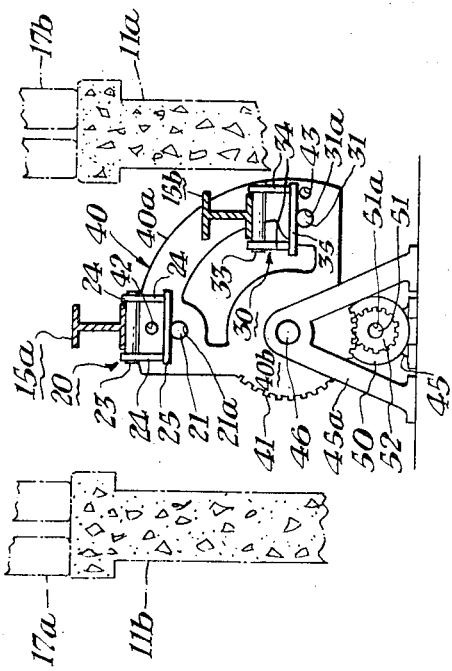

SINGLE GUIDE MEMBER TRANSIT VEHICLE SWITCHING MECHANISM

This invention relates to a guided roadway switch and more particularly to a switching arrangement for effectively establishing the route of travel for self-steering types of transportation vehicles along a vehicle roadway. The switching arrangement comprises at least a first and a second switching member, each of which has a first pivoting arrangement at one end thereof, and a second pivoting arrangement at the other end thereof and an actuating mechanism. The actuating mechanism interconnects the second pivoting arrangement of each switching member so that the position of the switching members may be switched to select the route of travel for a vehicle moving along the roadway.

With the ever increasing traffic problems besieging the cities of the world, the various transit authorities are considering other transportation modes for efficiently and effectively moving the masses in and about the metropolitan areas. One solution appears to lie in mass or rapid transit operations which not only have the required capacity but also have the necessary speed for conveying a large number of people from place to place quickly and safely. One type of a proposed mass or rapid transit system employs rubber tired vehicles which travel along a guided roadway. In general, the roadway which may be elevated, placed underground or at street level, includes a pair of running surfaces which are strattled by a central guiderail. The guiderail takes the form of a continuous beam having an I-shaped cross-section. The web portion of the guiderail I-beam accommodates the guide wheels which steer or guide the vehicles as they are propelled along the roadway. One major shortcoming of a guided rubber tire vehicle system resides in the inability to quickly and effectively change its route of travel. While various attempts have been proposed for switching the vehicles from one route to another, none of these previous schemes has successfully solved this switching problem. First, an acceptable guide switch must operate quickly and rapidly when the roadway is switched from one route of travel to another route of travel so that closely spaced vehicles may move along alternate routes of travel. Thus, it will be appreciated that the mass or bulkiness of the switch should be held to a minimum in order to effectively and efficiently accomplish a fast switching operation. Second, in order to permit the vehicles to pass through the guideway switch without requiring any appreciable reduction in their speed, the alignment of the stationary guiderail with the movable guiderail must be near perfect. Third, minimum size gaps or spacings should exist between the ends of the stationary and movable guideways in order to allow for high speed operations and, finally, for the purpose of safety, it is required that movable guideway be locked in position in order to eliminate the possibility of a vehicle running an open or partially open switch.

Accordingly, it is an object of this invention to provide a novel guideway switch for use in a self-steering transportation system.

Another object of this invention is to provide a novel switching assembly for selectively establishing the route of travel for a self-guided transportation vehicle.

A further object of this invention is to provide a new guideway switch for mass and/or rapid transit operations.

Yet another object of this invention is to provide a guided vehicle switching arrangement having a minimum switch operating time and a maximum vehicle pass-through time.

Still a further object of this invention is to provide an improved guideway switch having at least two movable guideways for selectively establishing alternate routes of travel and having a locking device for ensuring that the guideways are positively locked in position.

Still another object of this invention is to provide a guideway switching arrangement having at least two movable switching members each of which is pivoted at one end to allow movement in two modes and which is pivoted at the other end to allow movement in three modes.

Yet a further object of this invention is to provide a switching arrangement having a plurality of movable guiderail sections, an actuating means for selectively moving the movable guiderail sections in relation to the plurality of fixed guiderails and a locking device for positively locking the movable guiderail sections in relation to the fixed guiderails.

Yet another object of this invention is to provide a novel guideway switch which is economical in cost, simple in construction, reliable in operation, durable in use and efficient in service.

In the attainment of the foregoing objects a switch trackway has been developed for self-guiding vehicles and comprises a pair of movable guiderails, each pivoted at one end to allow movement in two modes, namely, rotationally and pivotally, and at the other end to allow movement in three modes, namely, rotationally, pivotally and translationally, and an actuating means. Each of the guiderails comprises an elongated I-beam. The actuating means is cooperatively associated with the above-noted other ends of each of the guiderails for selectively moving the guiderails in a first and a second position. A locking device may be employed to positively lock the guiderails in the above first and second positions. The actuating means includes a rotatable circular sector crank member which provides the above-noted cooperative association with the other ends of the guiderails and is engaged in a geared relationship to be driven by an electric motor.

Other objects, features and advantages of the present invention will become more apparent from the following description of a preferred embodiment described with reference to the accompanying drawings forming a part of this specification, in which:

FIG. 2 is a side elevational view of the roadway switching section shown in FIG. 1.

FIG. 3 is a sectional view taken along line III—III of FIG. 1 illustrating the actuating mechanism of the roadway switch.

SWITCHING ARRANGEMENT DESCRIPTION

Figure 1:
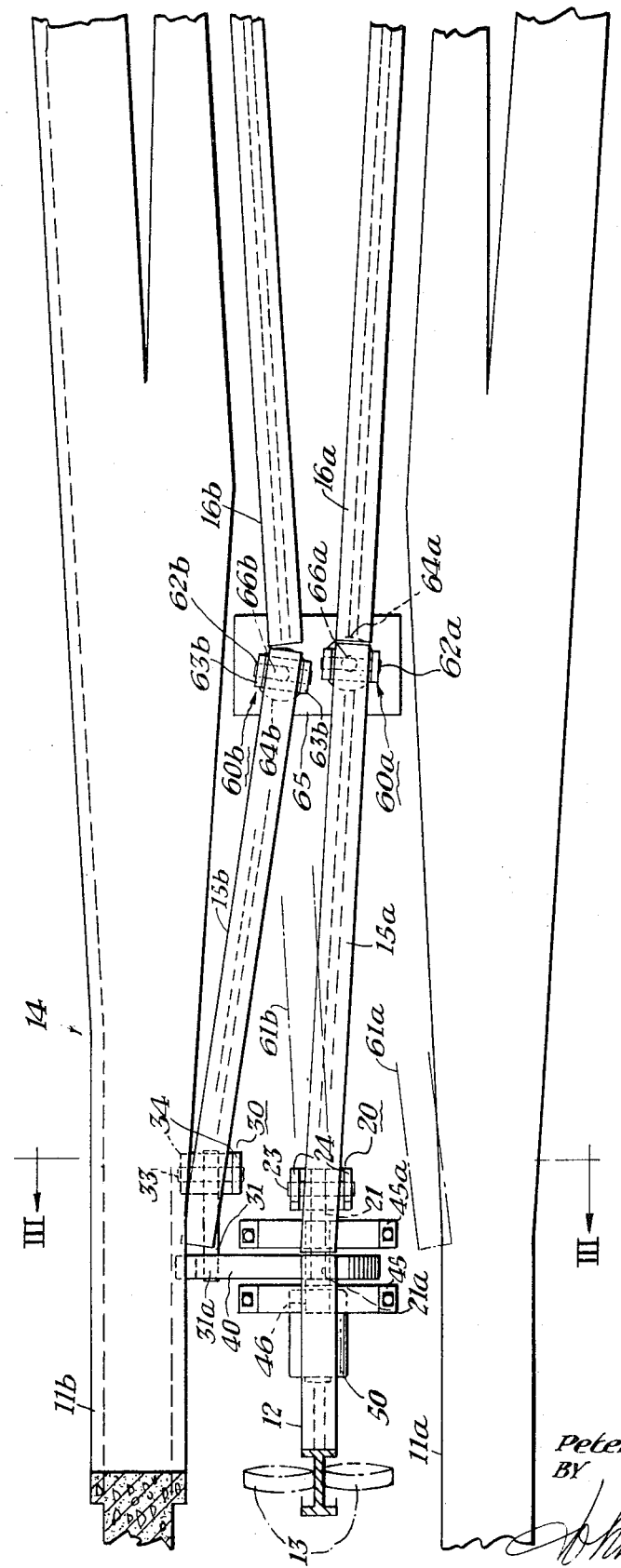
FIG. 1 is a top plan view of a portion of a guided roadway having a switching section for accommodating self-steering rubber tire vehicles which may be adapted for use in a mass and/or a rapid transit system.

Referring now to the drawings, and in particular to FIGS. 1 and 3, there is shown in FIG. 1 an elevated portion or roadway for rapid transit vehicles having a pair of spaced running tracks 11a and 11b and a guideway beam 12 leading into a switching portion generally characterized by numeral 14. The running tracks 11a and 11b which are adapted to support the main tires of rapid transit vehicles are preferably constructed of reinforced or prestressed concrete material. As shown in FIG. 3, each of the concrete tracks 11a and 11b has a T-shaped cross-section, the upper cross-piece of each track forming a flange portion which supports a vehicle's main tires such as shown by numerals 17a or 17b and the lower vertical piece of each track forming a web portion for support of the tracks. As shown in perspective in FIG. 1, the guideway beam 12 is preferably an elongated metal beam having an I-shaped cross-section with a web portion disposed between the upper and lower flange portions. The web portion of guideway I-beam 12 is arranged to be engaged by a pair of guide wheels 13, shown in phantom, commonly protruding from the undercarriages of the rapid vehicles, which arrangement allows for the direction of the path of travel of the rapid vehicles. That is, a rapid transit vehicle will move over and along a guideway beam 12, the web portion of which is engaged by guide wheels 13. Accordingly, when a switching portion along a path of travel is encountered, a rapid transit vehicle will move in the direction established by a continuity of the guideway beam 12 with a particular guideway switching member.

FIG. 1 shows a particular switching portion 14 of the type of roadway mentioned above. It is seen that within switching portion 14 are a first guideway switching member 15a and a second guideway switching member 15b, as well as corresponding first and second guideway stationary members 16a and 16b. To conform with continuity requirements, switching members 15a and 15b and stationary members 16a and 16b all have I-shaped cross-sections dimensionally identical to the I-shaped cross-section of the guideway beam 12 as can be seen by viewing FIG. 3 so that whenever there is a continuous alignment of either guideway beam 12, guideway switching member 15a, and guideway stationary member 16a or a continuous alignment of guideway beam 12, guideway switching member 15b and guideway stationary member 16b, a rapid vehicle will have a path of travel determined by the switching function performed within switching section 14. Members 15a, 15b, 16a and 16b are also preferably elongated metal beams.

As shown in FIG. 1, both first guideway switching member 15a and second guideway switching member 15b are pivotally secured at one end to a bi-modal carrier assembly securing block 65 respectively via first and second guideway switching member bi-modal carrier arrangements 60a and 60b to provide for movement at that end of guideway switching members 15a and 15b in two modes, specifically, rotational movement and elevational movement. The other ends of the guideway switching members 15a and 15b are secured to a rotatable member 40, which is preferably in the form of a circular sector crank, via the welding to pin supports 23 and 33 respectively of first and second guideway switching member tri-modal carrier arrangements 20 and 30, which also includes brackets 34, 34a and 24, 24a. In addition, there are bracket support plates 25 and 35 which are welded respectively to brackets 24, 24a and brackets 25, 25a. Bracket support plates 25 and 35 are, in turn, welded to longitudinally disposed pins 21 and 31 respectively. Rotatable member 40 is rotatably secured to "A" frames 45, 45a by a securing pin 46. The pins 21 and 31 are positioned within holes 21a and 31a, respectively, such that they will move longitudinally toward or away from rotatable crank arm member 40 during the rotation of rotatable crank arm 40. Movement of these other ends of guideway switching member 15a and 15b will thereby be provided in three modes, namely, rotational movement, translational movement and pivotal movement. The above-noted bi-modal and tri-modal movement of guideway switching members 15a and 15b will occur whenever an actuating motor 50, conventionally secured on bearings, not shown, having a shaft 51 is in an operating state to cause rotation of rotating member 40 in a manner to be described hereafter.

Bi-modal carrier arrangements 60a and 60b and trimodal carrier arrangements 20 and 30 will best be described by viewing the instant switching arrangement in FIG. 2 which depicts a side elevational view of the roadway switching section shown in FIG. 1. Specifically, FIG. 2 shows a second guideway switching member bi-modal carrier arrangement 60b which is identical to a first guideway switching member bi-modal carrier arrangement 60a. It will be seen that bi-modal carrier arrangement 60a comprises a supportive pin 62b (corresponding to pin 62a of arrangement 60a in FIG. 1) upon which one end of second guideway switching member 15b is rigidly welded. The pin 62b is rotatably secured between bi-modal carrier brackets 63b (corresponding to brackets 63a of arrangement 60a in FIG. 1) to provide for rotational movement about the cylindrical axis of pin 62b. As shown, the bi-modal carrier brackets 63b are supported by a bi-modal bracket support plate 64 b (corresponding to a support plate 64a of arrangement 60a in FIG. 1) which plate 64b is welded to a rotational shaft 66b (corresponding to a rotational shaft 66a of arrangement 60a in FIG. 1). The rotational shaft 66b is rotatably immersed in any well known bushing material 67b (not shown with respect to arrangement 60a) within supporting block 65 to provide for rotational movement of rotational shaft 66b about its cylindrical axis. Hence, the end of the second guideway switching member 15b which is supported by bi-modal carrier 60b is capable of moving pivotally via the rotational movement of pin 62b and also rotationally via the rotational movement of rotational shaft 66b. Similar movement capability is provided at the corresponding end of the first guideway switching member 15a via carrier arrangement 60a, i.e., the end of the first guideway switching member 15a which is supported by bi-modal carrier 60a is capable of moving pivotally via the rotational movement of pin 62a and also rotationally via the rotational movement of rotational shaft 66a.

Tri-modal carrier arrangement 20 and 30 will best be described by viewing FIG. 3 which shows a sectional view of FIG. 1 taken along lines III—III. As shown, tri-modal carrier arrangements 20 and 30 each have supportive pins 23 and 33 upon which the other ends of first and second guideway switching members 15a and 15b are respectively rigidly welded. The supportive pins 23 and 33 are respectively rotatably secured by first and second tri-modal carrier arrangement brackets 24 and 34. The brackets 24 and 34 are respectively welded to tri-modal bracket support plates 25 and 35, which are, in turn, respectively welded to longitudinally movable tri-modal plate support pins 21 and 31 in holes 21a and 31a of rotatable member 40. It will be noted that longitudinally movable pins 21 and 31 are designed for maximum longitudinal movement such that they will not become dislodged from holes 21a and 31a of rotatable member 40 during a particular switching rotation.

As shown in FIG. 3 the rotatable member 40 is preferably in the form of a circular sector crank having an outer arcuate portion 40a and an inner circular portion 40b which circular portion 40b has a gear driven segment as depicted by gear teeth 41. It is seen that the outer arcuate portion 40a of rotating member 40 subtends an angle of 90°, and that the gear driven segment 41 of the inner circular portion 40b of rotatable member 40 begins at one subtended radial side of the outer arcuate portion 40a of rotating member 40 and ends at the other subtended radial side of the outer arcuate portion 40a of rotatable member 40, the gear driven segment 41 of the inner circular portion 40b of rotatable member 40 being more radially distant from the outer arcuate portion 40a than the non-gear-driven segment.

Also shown in FIG. 3, shaft 51 of motor 50 extends through hole 51a of a gear driving member 52 which is welded to shaft 51. The gear driving member 52 has geared teeth which engages the teeth of the gear driven segment 41 of the inner circular portion 40b of rotatable crank arm member 40, and is preferably designed in such a manner that one revolution of shaft 51 of motor 50 would cause a partial revolution of rotatable crank arm member 40 so as to traverse the teeth of the gear driven segment 41 of the inner circular portion 40b of rotatable member 40. In other words, one revolution of shaft 51 of motor 50 will cause rotating member 40 to rotate through an angle of 90°. Accordingly, pins 21 and 31 are spaced 90° apart such that at the end of any given actuation by actuating motor 50, guideway beam 12 will directly align with either first guideway switching member 15a, or second guideway switching member 15b to provide guideway continuity in one of two possible directions. Furthermore, at the end of any given actuation by actuating motor 50, holes 42 and 43, shown in FIG. 3 are provided through rotatable member 40 for the rigid locking of the rotatable member 40 in place via a locking mechanism 70 shown in FIG. 2. It will be noted that holes 42 and 43 of rotating member 40 are angularly displaced such that at the end of any given actuation by actuating motor 50, the vertical center line of the hole which will be employed for locking is in direct alignment with the vertical center line of a circular cross section of the appropriate cylindrical tri-modal longitudinally movable pin 21 or 31.

The locking mechanism 70 shown in FIG. 2, preferably comprises a casing 71, conventionally bolted to the lower flange portion of guideway beam 12, which casing 71 houses a solenoid, not shown, and has a pair of input leads 80 and 81 upon which a current signal is impressed according to conventional cam controlling, not shown, to provide current to the solenoid only upon and during rotation of rotatable crank arm member 40 releasing a spring loaded locking pin 72 which is integral with the solenoid armature at the end of the above-noted rotation through either holes 21 or 31 of rotatable member 40 whenever rotatable member 40 is in the proper position, thereby locking rotatable member 40 at the end of a given actuation by the motor 50 and assuring that a rapid transit vehicle is not derailed at the switching portion 14. Should there be a malfunction of the locking mechanism when rotational movement of rotatable member 40 ceases, the presence of a signal on leads 80 and 81 in the absence of rotation of rotational member 40 may denote a state of incompleted or overcompleted switching which may be employed to prevent vehicles from moving into the switching portion 14.

SWITCHING ARRANGEMENT OPERATION

The drawings are now referred to for purposes of describing the switch operation of the present switching arrangement. With particular reference to FIG. 2, it will be seen that guideway switching member 15a is initially aligned with guideway beam 12 due to the initial position of the crank arm, or rotatable member 40, which is locked in place by locking pin 72 of locking device 70 through hole 42 in rotatable member 40. Guideway switching member 15b is initially diagonally positioned below and to the right of guideway switching member 15a as viewed from the left of FIG. 2 so as not to interfere with a rapid transit vehicle which may move in the direction provided for by guideway switching member 15a.

It will now be assumed that a switching of paths from that allotted for by the guideway switching member 15a to that allotted for by the guideway switching member 15b is desired. Accordingly, actuating motor 50 will be turned on preferably from a wayside control station, not shown, and shaft 51 of actuating motor and bearing gear driving member 52 will begin rotating in a clockwise fashion. As previously stated, the teeth of gear driving member 52 shown in FIG. 3 engage the teeth of the gear driven segment 41 of the inner circular portion 40b of rotatable crank arm member 40 and movement of the gear driving member 52 will provide a torque to the rotatable member 40 via the above-noted engagement causing the rotatable crank arm member 40 to rotate in a counterclockwise fashion. Simultaneously with the initiating of rotation of rotatable crank arm 40, current will be applied to the leads 80 and 81 to the solenoid of locking device 70 thereby causing the spring loaded locking pin 72 to be retracted from hole 42 in rotatable crank arm member 40 and allowing free rotational movement. During the rotational movement of the rotatable crank arm 40, the weight of the guideway switching member 15b will produce a force-vector on second tri-modal carrier pin 31 which will cause the pin 31 to move longitudinally towards the rotatable crank arm member 40. Accordingly, when FIG. 2 is viewed in particular, it will be seen that the end of second guideway switching member 15b, which is supported by second guideway switching member tri-modal carrier arrangement 30, is moved translationally towards the plan of rotatable member 40 via the translational movement of longitudinal pin 31, pivotally in accordance with a clockwise movement of supportive pin 33 about its cylindrical axis, and rotationally, in accordance with the clockwise movement of supportive pin 33 abouts its cylindrical axis and the longitudinal movement of pin 31 towards rotatable member 40. Further, the switching member 15b will move upward towards the place of guiderail 12. Similarly, the end of the first guideway switching member 15a which is supported by the first guideway switching member tri-modal carrier arrangement 20 will move translationally away from rotatable member 40 due to the longitudinal movement of carrier pin 21; it will move rotationally in accordance with the counterclockwise movement of supportive pin 23 about its cylindrical axis and the longitudinal movement of pin 21; it will also move pivotally in accordance with a counterclockwise rotation of supportive pin 23 about its cylindrical axis. Further the switching member 15a will move downward and away from the plane of guiderail 12.

During this actuating (or switching) period, the force due to the weight of the other end of the second guideway switching member 15b, which is supported by second guideway switching member bi-modal carrier 60b, will cause a torque to be applied to second bi-modal carrier arrangement pin 62b due to the rotation of rotatable crank arm member 40 such that second bi-modal carrier arrangement pin 62b will rotate in a clockwise fashion about its cylindrical axis. In addition, the entire second guideway switching member bi-modal carrier arrangement 60b will rotate in a clockwise fashion via the rotational movement of rotational shaft 66b as viewed from above the pictured roadway, which movement accommodates the rotational movement of the end of the second guideway switching member 15b which is supported by second guideway switching member tri-modal carrier arrangement 30. Hence, the end of the second guideway switching member carrier arrangement 15b, which is supported by second guideway switching member bi-modal carrier arrangement 30, will move pivotally due to the clockwise rotation of second bi-modal carrier pin 62b, as well as rotationally due to the rotational movement of rotational shaft 66b. Similarly, the other end of the first guideway switching member 15a which is supported by the first guideway switching member bi-modal carrier arrangement 60a will move pivotally due to the rotation of first bi-modal carrier pin 62a counterclockwise about its cylindrical axis, and rotationally due to the rotational movement of rotational shaft 66a about its cylindrical axis.

At the end of the rotational movement of rotatable crank arm member 40, the current to the solenoid of locking device 70 will be cut off due to the aforementioned cam controlling, and rotatable crank arm member 40 will be rigidly locked in place by the release of solenoid armature spring loaded locking pin 72 through hole 43 in rotatable crank arm member 40. Accordingly, the second guideway switching member 15b will have assumed the position shown by the outline 61b in FIG. 1, and first guideway switching member 15a will have assumed the position shown by the outline 61a in FIG. 1. Hence, a rapid transit vehicle moving along main rail 11a or main rail 11b will upon entering the switching portion 14 of the roadway either switch directions to rail 11b or remain in the direction of rail 11b in accordance with the aforementioned continuity requirement with respect to the guideway beam 12 and a particular guideway switching member. It will be appreciated that the time of commencement of switching and the switching time will be such that there will be an ample amount of time between the end of switching and the entrance of a rapid transit vehicle into the switching portion 14 to provide for a wayside alarm signal in the event of malfunction in order to assure that the vehicle doesn't enter the switching portion 14 during switching. Further, the switching time may be minimized in accordance with revolutional speed of the motor shaft 51.

From the foregoing description, it is apparent that the present switching arrangement provides for switching or maintaining the path of travel of self-guided vehicles. The switching arrangement provides for selectively establishing a route of travel for the self-guided vehicles which may be of the mass or rapid transit type, and has a minimum switch operating time, as well as a maximum vehicle pass-through time. The switching arrangement also ensures that guideway switching members are positively locked into place, which guideway switching members are pivotally movable at one end in two modes, and at another end in three modes. The arrangement is relatively simple in structure and it may be manufactured at a relatively low cost. While the guideway switching member is shown in the form of an I-beam, it may in practice take any suitable configuration. The fabrication of the switching arrangement is of course not limited to weldment approach referred to by way of example and any conventional technique may be employed to secure or create the requested structures needed to carry out the invention.

Since numerous changes may be made in the above-described construction and different embodiments of the present switching arrangement may be made without departing from the spirit and scope thereof, it is intended that all the subject matter contained in the foregoing description or shown in the accompanying drawings shall be interpreted as illustrative and not in a limiting sense.

Having thus described my invention, I claim:

1. A switching arrangement for use in a vehicle roadway having at least two selectable routes of travel, comprising at least two switching members, each of said switching members having a first rotational and pivotal connection at one end thereof and a second rotational, translational and pivotal connection at the other end thereof, and an actuating mechanism including a rotatable member in the form of a circular sector crank and a driving means interconnecting said rotational, translational and pivotal connection of each of said switching members so that the position of the said switching members may be switched to select the route of travel for a vehicle moving along said roadway.

2. A switching arrangement as defined in claim 1, wherein each of said switching members comprises an elongated beam.

3. A switching arrangement as defined in claim 1, wherein each of said switching means comprises a beam having an I-shaped cross-section.

4. A switching arrangement as defined in claim 1, wherein said driving means is an electric motor.

5. A switching arrangement as defined in claim 1, wherein said first connection includes a lateral and a vertical pivot pin.

6. A switching arrangement as defined in claim 1, wherein said second connection includes a lateral and longitudinal pivot pin.

7. A switching arrangement as defined in claim 1, wherein a locking device locks said rotatable member in position.

8. A trackway switch for self-guided vehicles comprising a pair of movable guiderails, each of said guiderails being pivoted at one end to allow movement in two directions and being pivoted at the other end to allow movement in three directions, and actuating means including an electric motor having a shaft which supports a gear driving member engaging a gear driven crank cooperatively associated with the other end of each of said guiderails for selectively moving said guiderails in a first and a second position.

9. A trackway switch as defined in claim 8, wherein a locking device positively locks said guiderails in said first and second positions.

10. A trackway switch as defined in claim 8, wherein said one end of said guiderails includes a lateral as well as a vertical pivot pin.

11. A trackway switch as defined in claim 8, wherein said other end of said guiderails includes a lateral as well as a longitudinal pivot pin.

12. A trackway switch as defined in claim 8, wherein each of said guiderails comprises an elongated I-beam.

* * * * *